(12) United States Patent
Wegmann et al.

(10) Patent No.: US 9,655,014 B2
(45) Date of Patent: May 16, 2017

(54) OPTIMIZING A HANDOVER BEHAVIOR OF A MOBILE RADIO COMMUNICATION NETWORK BASED ON AN EXTENDED DATA RECORD BEING ASSOCIATED WITH A USER EQUIPMENT

(75) Inventors: Bernhard Wegmann, Holzkirchen (DE); Ingo Viering, Munich (DE); Krzysztof Kordybach, Pulawy (PL); Daniela Laselva, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 90 days.

(21) Appl. No.: 14/238,210

(22) PCT Filed: Aug. 11, 2011

(86) PCT No.: PCT/EP2011/063825
§ 371 (c)(1),
(2), (4) Date: May 2, 2014

(87) PCT Pub. No.: WO2013/020598
PCT Pub. Date: Feb. 14, 2013

(65) Prior Publication Data
US 2014/0235245 A1      Aug. 21, 2014

(51) Int. Cl.
*H04W 24/00* (2009.01)
*H04W 36/00* (2009.01)

(52) U.S. Cl.
CPC ... *H04W 36/0083* (2013.01); *H04W 36/0033* (2013.01)

(58) Field of Classification Search
CPC .............................. H04W 24/00; H04W 46/00
See application file for complete search history.

(56) References Cited

U.S. PATENT DOCUMENTS

2006/0128394 A1* 6/2006 Turina .................. H04W 16/06
                                                  455/453
2010/0173626 A1* 7/2010 Catovic ............... H04W 76/027
                                                  455/423

(Continued)

FOREIGN PATENT DOCUMENTS

GB          2472791 A        2/2011
WO     WO2009135428 A1     11/2009

OTHER PUBLICATIONS

R3-093131; Huawei, Motorala; "Introduction of Cause in UE History Information IE"; 3GPP TSG-RAN WG3 Meeting #66; Jeju, South Korea, Nov. 9-13, 2009.

(Continued)

*Primary Examiner* — Myron K Wyche
(74) *Attorney, Agent, or Firm* — Harrington & Smith (57) ABSTRACT

It is described a method for optimizing a handover behavior of a mobile radio communication network including at least a first base station and a second base station. The method includes (a) performing a handover of a user equipment from the first base station to the second base station, (b) adding an information element representing a property of the radio link between the user equipment and the first base station to a data record being associated with the user equipment, (c) transferring the data record from the first base station to the second base station and (d) optimizing the handover behavior of the mobile radio communication network based on the added information element. It is further described a first base station and a second base station, which in conjunction which each other, are configured for carrying out the described handover behavior optimization method.

20 Claims, 3 Drawing Sheets (56) References Cited

U.S. PATENT DOCUMENTS

2010/0210271 A1    8/2010  Neubacher
2011/0124340 A1*   5/2011  Puttonen ........... H04W 36/0083
                                                        455/437
2011/0300807 A1*  12/2011  Kwun ................... H04W 24/10
                                                        455/63.1
2014/0160976 A1*   6/2014  Dimou ................. H04W 76/02
                                                        370/252

OTHER PUBLICATIONS

3GPP TS 36.423 V10.2.0 (Jun. 2011); "3rd Generation Partnership Project; Technical Specification Group Radio Access Network; Evolved Universal Terrestrial Radio Access Network (E-UTRAN); X2 application protocol (X2AP) (Release 10)"; 130 pgs.
3GPP TS 36.331 V10.2.0 (Jun. 2011); "3rd Generation Partnership Project; Technical Specification Group Radio Access Network; Evolved Universal Terrestrial Radio Access (E-UTRA); Radio Resource Control (RRC); Protocol specification (Release 10)"; 294 pgs.
3GPP TS 23.203 V11.2.0 (Jun. 2011); "3rd Generation Partnership Project; Technical Specification Group Services and System Aspects; Policy and charging control architecture (Release 11)"; 142 pgs.
Huawei; "Active mode Inter RAT ping pong"; R3-103001; 3GPP TSG RAN WG3 Meeting #69bis; Xi'an, China; Oct. 11-15, 2010; whole document (4 pages).
Awada et al.; "Towards Self-Organizing Mobility Robustness Optimization in Inter-RAT Scenario"; IEEE Proc. of 2011 Spring Vehicular Technology Conference; May 15, 2011; whole document (5 pages).

\* cited by examiner

FIG 2A

| Cell # | Dwell time | HO cause | QoS |
|---|---|---|---|
| 17 | 30 sec | Radio conditions | RT |
| 18 | 15 sec | Traffic Steering | nRT |
| 27 | 2 sec | Radio conditions | RT |
| 18 | | | |

| Cell # | Dwell time | HO cause | Location |
|---|---|---|---|
| 17 | 30 sec | Radio conditions | Loc. 1 |
| 18 | 15 sec | Traffic Steering | Loc. 2 |
| 27 | 2 sec | Radio conditions | Loc. 3 |
| 18 | | | |

| Cell # | Dwell time | HO cause | HO Trigger |
|---|---|---|---|
| 17 | 30 sec | Radio conditions | A3 |
| 18 | 15 sec | Traffic Steering | A5 |
| 27 | 2 sec | Radio conditions | A3 |
| 18 | | | |

OPTIMIZING A HANDOVER BEHAVIOR OF A MOBILE RADIO COMMUNICATION NETWORK BASED ON AN EXTENDED DATA RECORD BEING ASSOCIATED WITH A USER EQUIPMENT

FIELD OF INVENTION

The present invention relates to the field of controlling handovers of user equipments within mobile radio communication networks. In particular, the present invention relates to a method for optimizing a handover behavior of a mobile radio communication network comprising at least a first base station and a second base station. Further, the present invention relates to a first base station and to a second base station, which in conjunction which each other, are configured for carrying out the described handover behavior optimization method.

ART BACKGROUND

One important area in the technical field of mobile radio communications relates to the handover (HO) of User Equipment (UE) from a (serving) source cell to a (neighboring) target cell and the optimization of parameters controlling the HO. In this technical field Self Optimizing Networks (SON) and in particular Mobility Robustness Optimization (MRO) are objects of high interest.

The object of MRO is to optimize network configuration parameters (e.g. handover (HO) trigger parameters, HO thresholds or timers) such that the number of Radio Link Failures (RLFs) due to problematic HOs is reduced. A HO is triggered by measurement events reported by a UE, wherein the measurement events in turn are triggered by neighbor and serving cell measurements. In case of a simple relative comparison of a signal strength from a serving Base Station (BS) with a signal strength from a neighboring potential target BS only a single offset parameter has to be specified for the HO trigger. In case of two different Radio Access Technologies (RATs) (and sometimes also for two different frequencies in the same RAT) absolute signal values of source cell and target cells have to be considered, i.e. two thresholds have to be fulfilled simultaneously for triggering a HO event.

HO problems which might even cause RLFs may occur in case the thresholds used have an inappropriate value. 3GPP has specified three different categories of HO problems which may cause a RLF:
(a) Failures due to too late HO triggering
(b) Failures due to too early HO triggering
(c) Failures due to HO to a wrong cell A further HO problem which typically does not cause RLFs but which causes a lot of signaling load are so called ping-pong handovers which occur in particular if a UE is located within a border region between a first BS and a second BS.

There may be a need for improving the handover behavior of a mobile radio communication network.

SUMMARY OF THE INVENTION

This need may be met by the subject matter according to the independent claims. Advantageous embodiments of the present invention are described by the dependent claims.

According to a first aspect of the invention there is provided a method for optimizing a handover behavior of a mobile radio communication network comprising at least a first base station and a second base station. The provided method comprises (a) performing a handover of a user equipment from the first base station to the second base station, (b) adding an information element representing a property of the radio link between the user equipment and the first base station to a data record being associated with the user equipment, (c) transferring the data record from the first base station to the second base station and (d) optimizing the handover behavior of the mobile radio communication network based on the added information element.

The described handover (HO) behavior optimization method is based on the idea by adding the described information element being indicative for the property of the radio link between the user equipment (UE) and the first base station (which has served the user equipment before the HO) to the data record which in accordance with current 3GPP standards already contains information about the radio connections of the UE in the past, the mobile radio communication network will be able to optimize its HO behavior for future HOs which, as a consequence, might be triggered earlier or later as compared to HO trigger events which are generated before the described handover behavior optimization has been completed.

The UE may be any type of communication end device, which is capable of connecting with an arbitrary communication network access point (e.g. the two base stations (BSs)). In particular the UE may be a cellular mobile phone, a Personal Digital Assistant (PDA), a tablet computer, a notebook computer and/or any other movable radio communication device.

The data record may be transferred from the first BS to the second BS via a so called X2 interface between the two BSs. This may provide the advantage that in case the above described method is carried out within an LTE network, a standardized interface between eNodeBs, which interface already exists, can be employed. This means that the described HO behaviour optimization method can be easily realized in known mobile radio communication networks without having the need to modify the corresponding network architecture. Of course, in case an X2 interface is used, the structure of the data record must comply with the standardized X2 requirements.

According to an embodiment of the invention optimizing the handover behavior comprises (a) adapting the value of at least one handover radio threshold for triggering a handover of the user equipment between different base stations because of radio link conditions being experienced by the user equipment and/or (b) adapting the value of at least one traffic steering parameter for changing the distribution the radio data load between different radio cells of the mobile radio communication network.

This may provide the advantage that the HO behavior of the mobile radio communication network can be effectively optimized by known and comparatively simple measures. Specifically, if for instance a problematic HO was triggered because of the (changing) radio link conditions of a (moving) UE it may be advantageous not to modify the traffic steering parameter(s). Correspondingly, if a problematic HO was triggered (mainly) because of traffic steering reasons the value(s) of the corresponding traffic steering parameter(s) was probably set too aggressive it might be a good idea to leave the HO radio thresholds unchanged.

According to a further embodiment of the invention the method further comprises (a) performing a further handover of the user equipment from the second base station to a third base station of the mobile radio communication network, (b) adding a further information element representing a property of the radio link between the user equipment and the second base station to the data record being associated with the user equipment and (c) transferring the data record from the second base station to the third base station. Thereby, optimizing the handover behavior of the mobile radio communication network is carried out further based on the added further information element.

This may provide the advantage that the data record is meaningful not only for the property of the (previous) radio link between the UE and the first base station but also for the property of the radio link between the UE and the second base station. As a consequence, the HO behavior of the mobile radio communication network can be optimized in a more reliable way.

It is mentioned that the described method is not limited by adding only two information elements being indicative for radio link properties of the UE to the data record. The data record may be a history file wherein any number of radio link properties can be stored, which have been enjoyed by the UE in the past before one of a plurality of HOs has been accomplished. Specifically, the data record may comprise all data, which in accordance with the current 3GPP specification of the X2 interface 36.423, section 9.2.38-9.2.40 are also included/added to the UE history. In this respect the described data record may be denominated an extended UE history file.

According to a further embodiment of the invention the third base station and the first base station are the same. This may provide the advantage that in particular so called multiple ping-pong HO which do not lead to a Radio Link Failure (RLF) or even a complete call drop but which cause unnecessary high signaling load can be analyzed with respect to the property of the radio link between the user equipment and the base station which has been serving the UE before the respective HO. As a consequence, the HO behavior of the mobile radio communication network can be improved in particular with respect to unnecessary ping-pong HOs and the overall signaling overload within the mobile radio communication network can be reduced.

It is pointed out that a ping-pong HO is a very common phenomenon which is responsible for degrading the performance of a mobile radio communication network. Specifically, a ping-pong handover is a frequent HO to and from two cells of a cell pair. The ping-pong effect may occur due to a frequent movement of the UE between the respective cell pair and/or due to comparatively high signal fluctuation at a common boundary of the cell pair. Also too aggressive radio data traffic steering parameters may be the reason for ping-pong HO. Since the ping-pong HO increases the times of HO and thus the loading of the network, it is important for network operators to reduce this undesirable effect.

According to a further embodiment of the invention the first base station is assigned to a first radio access technology and the second base station is assigned to a second radio access technology, wherein the second radio access technology is different from the first radio access technology. This may mean that the described HO behavior optimization method can also be accomplished in connection with inter Radio Access Technology (RAT) HOs.

At this point it is mentioned that it is not essential that the UE HO is a inter RAT HO. Of course, the described method can also be accomplished in connection with intra RAT HOs.

According to a further embodiment of the invention a first radio link between the user equipment and the first base station is assigned to a first radio frequency and a second radio link between the user equipment and the second base station is assigned to a second radio frequency, wherein the second radio frequency is different from the first radio frequency. This may mean that the described HO behavior optimization method can also be accomplished in connection with inter frequency HOs. Thereby, the two BSs may be assigned to the same RAT or alternatively to different RATs.

According to a further embodiment of the invention the data record comprises characteristic information about at least one radio connection between the user equipment and a base station, in particular between the user equipment and at least the first base station, which has served the user equipment in the past. This may provide the advantage that the optimization of the HO behavior can be further carried out based on the described characteristic information and, as a consequence, the optimization of the HO behavior may be even more reliable.

It is mentioned that the characteristic information may be added to the data record when a HO is performed. Thereby, the characteristic information may relate to the radio connection between the UE and the previously serving base station, which in the context of the HO is the source base station. As has already been mentioned above the data record is transferred from the source BS to the target BS, which after the HO has been completed represents at least for some time the serving BS.

According to a further embodiment of the invention the characteristic information comprises (a) a dwell time representing the time duration of the radio connection between the user equipment and the first base station and/or (b) a cell identifier of the first base station. Thereby, the dwell time and/or the serving cell ID of any radio link can be added to the data record which has been used for serving the base station in the past.

In other words, when a (source) BS hands over the UE to a (target) BS the source BS adds the respective entry to the characteristic information such that the (target) BS and all further (future) target BS will have information about the radio link history of the UE. Thereby, the data record may be seen as a log file to which with each HO a corresponding time information and/or information about the identity of the source BS may be added.

According to a further embodiment of the invention the property of the radio link between the user equipment and the first base station is indicative for the cause of triggering the handover and/or the property of the radio link between the user equipment and the second base station is indicative for the cause of triggering the further handover. This may provide the advantage that valuable information for effectively optimizing the HO behavior of the mobile radio communication network are collected.

According to a further embodiment of the invention (a) the cause of triggering the handover are radio link conditions being experienced by the user equipment or (b) the cause of triggering the handover is a traffic steering procedure for changing the distribution the radio data load between different radio cells of the mobile radio communication network. This may provide the advantage that the reason(s) for HO(s) can be more precisely comprehended and appropriate measures for optimizing the HO behavior of the mobile radio communication network can be carried out. This holds in particular for unwanted ping-pong HOs which can be effectively reduced. Thereby, if for instance the cause for at least one of the HOs of a ping-pong HO is a traffic steering procedure, it may be appropriate to set the corresponding traffic steering parameters less aggressive.

In this respect it is mentioned that traffic steering might be accomplished because of different reasons. One reason may be that the source cell suffers from a high radio data load whereas at the same time the target cell has to handle only a comparatively small radio data load. In order to balance the radio data load it may be advantageous to hand over at least one UE, which is preferably located within a border region between the source cell and the target cell, from the source cell to the target cell. In this case the motivation for radio data traffic steering is a radio data balancing.

Another reason for accomplishing traffic steering might be that although the radio conditions for a UE within a source cell are good a HO to a target cell makes sense if, e.g. because of different RATs, the target cell can handle a higher radio data rate being requested by the user of the UE. Such a higher radio data rate may be requested for instance if the user of the UE wants to participate in a video conferencing session.

It is explicitly mentioned that there may be also other reasons or motivations for a traffic steering procedure.

According to a further embodiment of the invention the property of the radio link between the user equipment and the first base station and/or the property of the radio link between the user equipment and the second base station is indicative for a Quality of Service which the user equipment enjoyed before the handover.

The Quality of Service (QoS) could be specified for instance by QoS Class Indicator (QCI) values as defined for instance in the 3GPP Technical Specification 23.203. Thereby, it may be distinguished for instance whether the user of the UE has enjoyed a Real Time (RT) or a non Real Time (nRT) service. A further useful distinction may be for instance whether (a) the user of the UE has enjoyed a Guaranteed Bit Rate (GBR) of e.g. 512 kbps (512 kilo bits per second) or (b) a non GBR or so called best effort radio data traffic. Such a distinction may be in particular useful because it is essential for service providers to ensure that their GBR users can always enjoy their GBR. Descriptive speaking: The GBR users should get what they have paid for.

It is mentioned that the above given distinctions are not exclusive and that the (further) information element being added to the data record may include any other distinction which from a technical point of view makes sense in order to learn more about the current HO behavior of the mobile radio communication network.

According to a further embodiment of the invention the property of the radio link between the user equipment and the first base station is determined by the location of the user equipment during the handover and/or the property of the radio link between the user equipment and the second base station is indicative for the location of the user equipment during the further handover. This may provide the advantage that specific spots, where HO failures and/or HO problems frequently occur, can be identified and special location sensitive measures for improving the HO behavior of the mobile radio communication network can be applied.

The location indicative information may be e.g. a Global Positioning System (GPS) information, an Assisted Global Positioning System (A-GPS) information or just a configured location identifier such as for instance a particular street.

The location specific information could also be derived from other known measurement principles such as for instance a location finding based on Wireless LAN networks, a location finding based on the so called Observed Time Difference of Arrival (OTDA) procedure, and/or from a so-called RF fingerprint which is given by a combination of signal strength measurements of different surrounding base stations.

According to a further embodiment of the invention the information element and/or the further information element is indicative for the type of a measurement event which is responsible for triggering the handover. This may provide the advantage that more information about the HO will be captured and a further improvement of the HO behavior of the mobile radio communication network may be possible.

Thereby, depending on the type of HO (e.g. an inter RAT or an intra RAT) different measurement types may have been used and corresponding information may be included in the information element and/or in the further information element.

For instance an intra RAT HO between two Long Term Evolution (LTE) base stations (i.e. eNodeBs) may have been triggered by a so called A3 measurement. Thereby, it is only checked whether one single condition like for instance a predefined signal strength offset between (a) the UE and the source BS and (b) the UE and the target BS is fulfilled. If this is the case the intra LTE HO is triggered.

Another example for a measurement event triggering an intra RAT (in particular intra LTE) HO is the so called A5 measurement event. With an A5 measurement it is determined whether two different conditions are fulfilled before an HO trigger is released. Specifically, by means of an A5 measurement it is determined whether (a) the signal strength between the source BS and the UE is smaller than a first threshold and (b) the signal strength between the target BS and the UE is larger than a second threshold. Generally speaking, before a HO trigger is released two measurement values are compared with two different threshold values, wherein respectively one measurement value is assigned to one threshold value.

For instance an inter RAT HO may have been triggered by a so called B1 measurement. A B1 event is given when the signal strength of a neighboring (target) cell of a different RAT is larger than a predefined threshold. Another example for a measurement event triggering an inter RAT HO is the so called B2 measurement event, which is only given if two conditions are fulfilled. Specifically, a first condition is fulfilled if the signal strength from the serving (source) BS becomes worse than a first threshold "B2-1" and the signal strength from the neighboring (target) BS becomes better than a second threshold "B2-2". Only if these conditions are fulfilled a corresponding inter RAT HO trigger will be released.

It is mentioned that the above given enumeration of measurement events is not exclusive and the information element and/or the further information element may be indicative also for other measurements events which are specified e.g. in the technical specification 3GPP TS 36.331.

According to a further aspect of the invention there is provided a first base station for a mobile radio communication network for optimizing a handover behavior of the mobile radio communication network. The first base station comprises (a) a control unit for controlling a handover of a user equipment from the first base station to a second base station of the mobile radio communication network, (b) an adding unit for adding an information element representing a property of the radio link between the user equipment and the first base station to a data record being associated with the user equipment and (c) a transmitting unit for transmitting the data record from the first base station to the second base station. Thereby, based on the information element added to the data record the handover behavior of the mobile radio communication network can be optimized.

The described first BS is based on the idea that the communication network will be able to optimize its HO behavior for future HOs if the property of the radio link between the user equipment and the first base station is known by a network entity which is executing the optimization of the HO behavior.

In a decentralized solution the HO behavior optimizing network entity of the mobile radio communication network may be the first BS and/or the second BS. In a centralized solution the network entity which is responsible for optimizing the HO behavior optimization may be the so called Operation And Maintenance (OAM) center, which is connected to the BSs via a so called northbound or southbound interface.

According to a further aspect of the invention there is provided a second base station for a mobile radio communication network for optimizing a handover behavior of the mobile radio communication network. The provided second base station comprises (a) a control unit for controlling a handover of a user equipment from a first base station of the mobile radio communication network to the second base station and (b) a receiving unit for receiving a data record being associated with the user equipment from the first base station, wherein an information element representing a property of the radio link between the user equipment and the first base station has been added to the data record. Thereby, based on the information element added to the data record the handover behavior of the mobile radio communication network can be optimized.

Also the described second BS is based on the idea that the communication network will be able to optimize its HO behavior for future HOs if the radio link property being enjoyed between by the user equipment and the first base station is known by a network entity which is executing the optimization of the HO behavior.

In a decentralized solution the HO behavior optimizing network entity of the mobile radio communication network may be the second BS and/or the first BS. In a centralized solution the network entity which is responsible for optimizing the HO behavior optimization may be the so called Operation And Maintenance (OAM) center, which is connected to the BSs via a so call northbound interface.

According to a further aspect of the invention there is provided a computer program for optimizing the handover behavior of a mobile radio communication network. The computer program, when being executed by a data processor, is adapted for controlling and/or for carrying out the handover behavior optimization method as described above.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustration in the drawing is schematically. It is noted that in different figures, similar or identical elements are provided with reference signs which are different from the corresponding reference signs only within the first digit.

Figure 1:
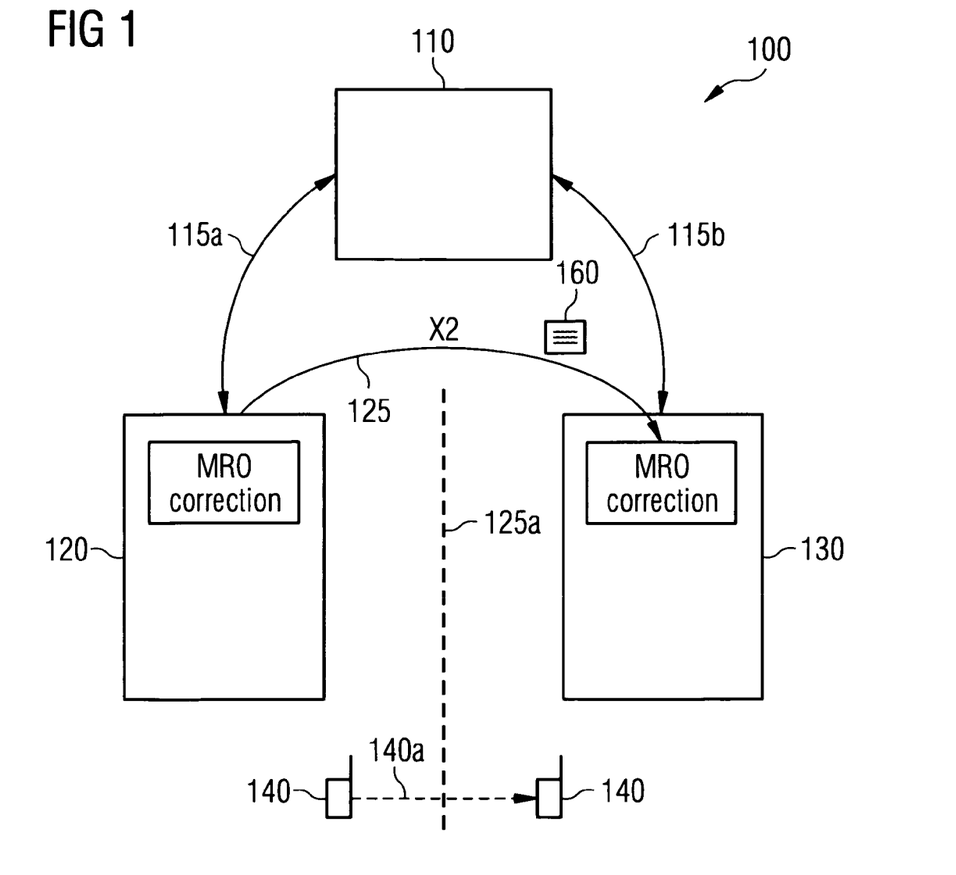
FIG. 1 shows a mobile radio communication network comprising two base stations which are adapted for exchanging an extended data record with an information element representing the cause of triggering a handover of a user equipment.

FIG. 1 shows in accordance with embodiments of the invention described in this document a mobile radio communication network 100 which comprises a central unit 110, a base station (BS) 120 and a further base station 130. According to the embodiment described here the network 100 is a LTE network, the central unit 110 is an Operation And Maintenance (OAM) Center or a Domain Manager (DM) and the two base stations 120, 130 are eNodeBs.

In accordance with current 3GG standards the two eNodeBs 120 and 130 are connected with each other via an X2-interface 125. The eNodeB 120 is connected in a known manner with the OAM Center 110 via a so called Northbound interface 115a. Correspondingly, the eNodeB 130 is connected in a known manner with the OAM Center 110 via another Northbound interface 115b.

Each of the two BSs 120 and 130 spans a radio cell of the mobile radio communication network 100. A (part of the) cell border between the two cells is illustrated by a dashed line which is denominated with reference numeral 125a.

As can be seen from FIG. 1, the mobile radio communication network 100 further comprises a User Equipment (UE) 140, which initially is served by the eNodeB 120 representing the source BS of the mobile radio communication network 100.

The UE 140 may be any type of communication end device, which is capable of connecting with an arbitrary communication network access point (e.g. the eNodeBs 120, 130) of the mobile radio communication network 100. In particular the UE 140 may be a cellular mobile phone, a Personal Digital Assistant (PDA), a notebook computer and/or any other movable communication device.

The arrow 140*a* in FIG. 1 indicates the movement of the UE 140, which is accomplished from the (source) cell being assigned to the eNodeB 120 towards the target cell being assigned to the eNodeB 130. In order to ensure that the UE 140 is always connected to the mobile radio communication network 100 the UE 140 has to be handed over from the source eNodeB 120 to the target eNodeB 130. Thereby, in accordance with current 3GPP standards a data record 160 is forwarded from the first source eNodeB 120 to the second target eNodeB 130 via the X2-interface 125. This data record 160, which is also denominated UE history, is associated with the UE 140. This means that if the UE 140 will be handed over to a not depicted third eNodeB the UE history 160 will be forwarded from the second eNodeB 140, which now represents the source BS, to the third eNodeB, which now represents the target BS. Thereby, the third eNodeB may be the same or may be different from the first eNodeB. If the first eNodeB and the third eNodeB are the same an unnecessary ping-pong HO may have been occurred.

In further accordance with current 3GPP standards the data record respectively the UE history 160 comprises information about the cells which in the past have served the UE 140 and also about the time duration the UE 140 has been served by each of the previous BSs. Specifically, for each BS which has served the UE 140 in the past the UE history 160 comprises a first entry representing an identification number of the respective BS and a dwell time representing to time duration for which the UE 140 has been served by the respective BS.

In this respect it is mentioned that if the UE 140 is disconnected from the mobile radio communication network 100 for instance because the user of the UE 140 has switched off the UE 140, the UE history 160 is deleted. If at a later time the UE 140 is again connected to the mobile radio communication network 100, a new UE history 160 will be generated.

In accordance with an embodiment of the invention described in this document the above described UE history is extended by an information element representing the cause of triggering the HO of the UE 140. Therefore, the UE history can be denominated an extended UE history 160.

By using the described extended UE history 160 it is possible for all BSs, which at any time serve the UE 140, to get more detailed information about the previous HOs of the UE 140 and in particular about the reasons respectively the causes of triggering the previous HOs. Since in LTE the BSs respectively the eNodeBs are connected with each other via X2-interfaces this more detailed information can be provided in principal to each of the eNodeBs and in particular to those eNodeBs which have been involved in previous HOs of the UE 140. Further, the information can also be provided to the central unit 110, which is connected to the eNodeBs 120, 130 via the above mentioned Northbound interfaces 115*a* and 115*b*.

Based on the provided additional information about the HO causes the mobile radio communication network 100 will be able to optimize its HO behavior for future HOs which, as a consequence, might be triggered earlier or later as compared to HO trigger events which are generated before the described handover behavior optimization has been completed.

According to the embodiment described here the HO behavior is optimized by a Mobility Robustness Optimization (MRO), which is carried out in a decentral manner by the first (source) eNodeB 120 and/or by the second (target) eNodeB 130. Thereby, network configuration parameters (e.g. handover (HO) trigger parameters, HO thresholds or timers) are corrected respectively optimized such that in the future the number of problematic HOs will be reduced.

In this respect it is pointed out that in principle also a centralized MRO may possible, which may be accomplished in particular at least partially by the central unit 110.

The described (extended) UE history may be used in particular for reducing the number and/or the probability of unnecessary ping-pong HOs. Specifically, in the following a ping-pong HO from the BS 120 to the BS 130 and then back to the BS 120 is assumed. This means that the first (source) BS 120 executed a successful HO of the UE 140 to the second (target) BS 130 and the second (now the source) BS 130 executed a successful HO of the UE 140 to the first (target) BS 120. Based on the UE history 160 and in particular based on the dwell time entry of the UE history the first BS 120 will realize that it has caused a ping-pong HO because the dwell time in the second cell being served by the second BS 130 was small. This finding will be extended because with the additional information being comprised in the extended UE history 160, the first BS 120 will additionally "remember" why it has initiated the first HO to the second BS 130. Based on this additional information the first BS 120 will be able to perform an improved MRO which will lead to corrected network configuration parameters (e.g. handover (HO) trigger parameters, HO thresholds or timers) such that the number of ping-pong HOs in the future will be reduced.

In this respect it is mentioned that solely with the information being included in known UE history messages the first BS 120 would not be able to "remember" why it has initiated the original HO since the UE cannot be associated with any UE context which may (or may not) still be in the memory of the first BS 120 because of data privacy reasons there are no unique UE identifiers known to the first BS 120.

Figure 2A:
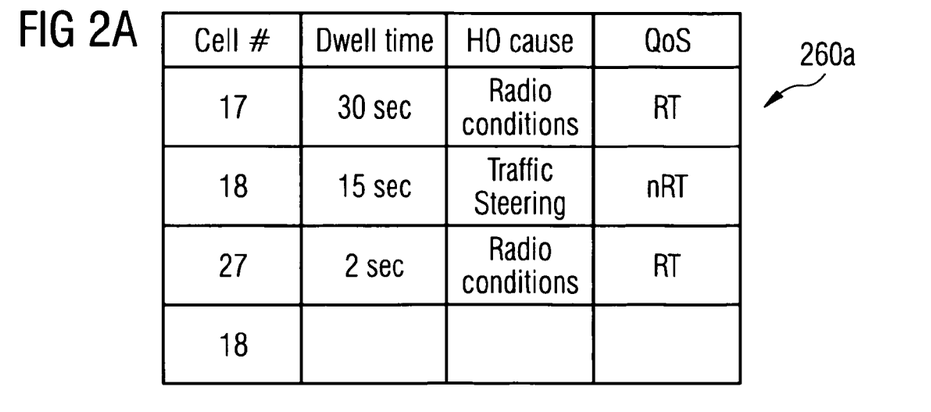
FIGS. 2a, 2b and 2c show different examples for extended data records which in addition to the handover cause comprise further handover related information.
Figure 2B:
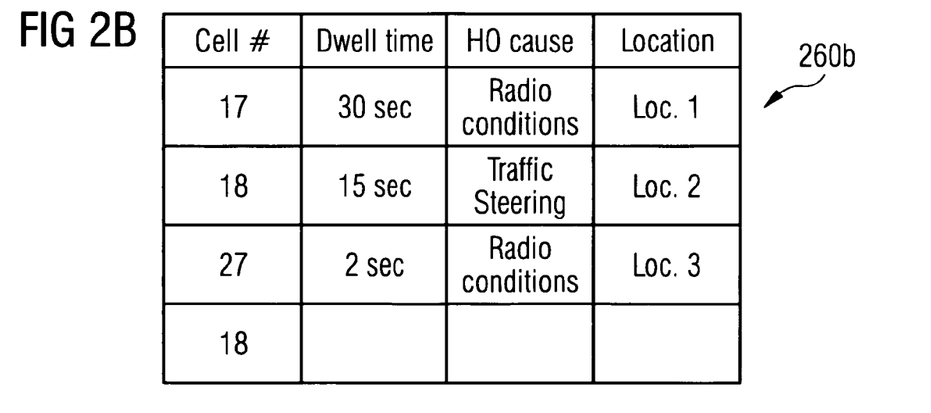
Figure 2C:
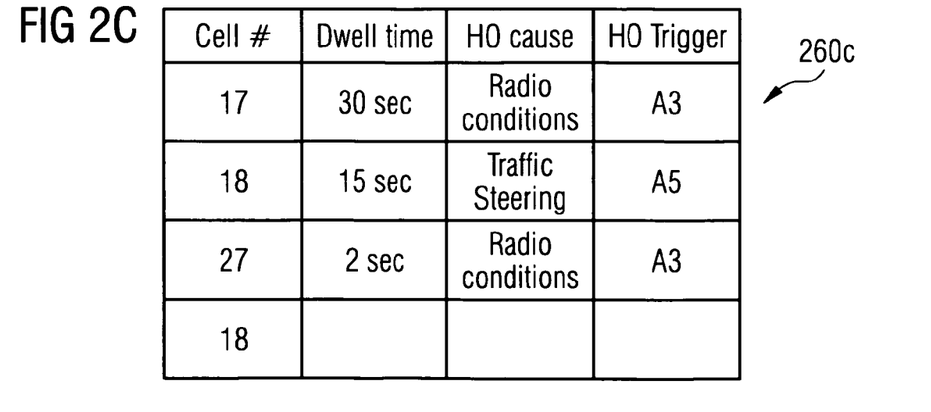

FIGS. 2*a*, 2*b* and 2*c* show different examples for extended data records (UE histories) which in addition to the handover cause comprise further HO related information. FIG. 2*a* shows a first extended UE history 260*a*, FIG. 2*b* shows a second extended history 260*b* and FIG. 2*c* shows a third extended history 260*c*.

In a logical representation the information being included in the extended UE histories 260*a*, 260*b* and 260*c* can be best depicted in a matrix type table. However, it is pointed out that the matrix type illustration is just used for the purpose of an easier understanding. The information can be included in the extended UE histories 260*a*, 260*b* and 260*c* in any other arbitrary manner.

In FIGS. 2*a*, 2*b* and 2*c* the table entries of the first and the second column are already known from the current 3GPP specification of a UE history. Table entries of the third and the forth column represent so called additional information which is only given in the extend UE histories 260*a*, 260*b* and 260*c*.

According to the embodiments illustrated in FIGS. 2*a*, 2*b* and 2*c* a UE has first been served by (a BS being assigned to) a radio cell with the ID 17 for 30 seconds. Because of deteriorating radio conditions the UE has been handed over to a cell with the ID 18, which for the sake of conciseness is denominated cell 18. After a dwell time of 15 seconds the UE is handed over to a cell with the ID 27 (cell 27). The reason for this second HO is traffic steering (e.g. the cell 18 wants to get rid of some radio data load). After a dwell time of 2 seconds with cell 27 the radio conditions are so bad that a (ping-pong) HO to the cell 18 is necessary. Therefore, in the present case the parameters for traffic steering have apparently been set too aggressive. Therefore, in order to avoid such type of ping-pong HO in the future the traffic steering parameters should be set more gently.

It is mentioned that in accordance with the invention described in this document in addition to the HO cause given in the third column of the extended UE histories 260*a*, 260*b* and 260*c* the extended UE histories might optionally also include further information about the handed over UE.

As can be seen from FIG. 2*a*, the additional UE related information may be indicative whether the user of the UE has enjoyed a Real Time (RT) or a non Real Time (nRT) radio service.

As can be seen from FIG. 2*b*, the additional UE related information may be indicative for the location of the UE during the respective HO. This may provide the advantage that specific spots, where HO failures and/or HO problems frequently occur, can be identified and special location sensitive measures for improving the HO behavior of the mobile radio communication network can be applied.

As has already been mentioned above, the location specific information may be derived for instance from a Global Positioning System (GPS) information, from an Assisted Global Positioning System (A-GPS) information, from the strength of signals received from different Wireless LAN networks, from a so called Observed Time Difference of Arrival (OTDA) procedure, and/or from a so-called RF fingerprint which is given by a combination of signal strength measurements of different surrounding base stations.

As can be seen from FIG. 2*c*, the additional UE related information may be the type of a measurement event which was responsible for triggering the respective HO to a neighboring target cell. This may provide the advantage that more information about the HO will be captured and a further improvement of the HO behavior of the mobile radio communication network may be possible.

According to the embodiment described in FIG. 2*c* the HO from cell 17 to cell 18 was triggered by a so called A3 measurement (single condition trigger for an intra RAT HO between two LTE cells). Further, the HO from cell 18 to cell 27 was triggered by a so called A5 measurement (dual condition trigger for an intra RAT HO between two LTE cells).

It is mentioned that depending on the radio scenario the extended UE history may also comprise information about other measurement events (e.g. B1 and B2), which together with the measurements A3 and A5 have already been elucidated above.

It is further mentioned that the above given additional information QoS, location and type of HO trigger are not exclusive and that also further additional information may be added to the extended UE history. Also more than one additional information element such as for instance a combination of QoS, location and type of HO trigger might be possible.

Figure 3:
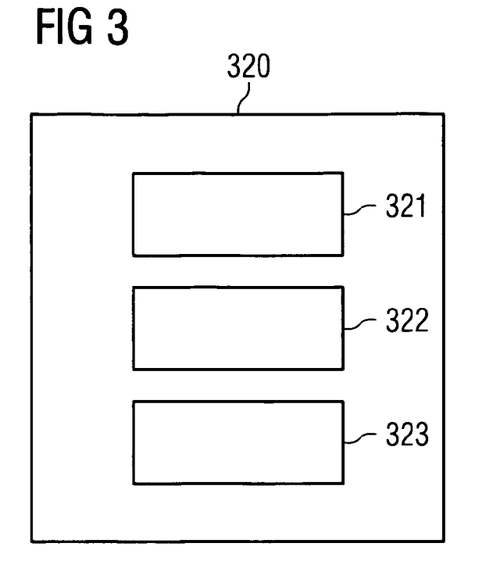
FIG. 3 shows a first (source) base station for a mobile radio communication network for optimizing the handover behavior of the mobile radio communication network.

FIG. 3 shows a first (source) BS 320 for a mobile radio communication network for optimizing the HO behavior of the mobile radio communication network. The first BS 320 comprises (a) a control unit 321 for controlling a HO of a UE from the first BS 320 to a second BS of the mobile radio communication network, (b) an adding unit 322 for adding an information element representing a property of the radio link between the user equipment and the first base station 320 to an extended UE history record being associated with the UE and (c) a transmitting unit 323 for transmitting the UE history record from the first BS to the BS. Thereby, based on the information element added to the UE history record the HO behavior of the mobile radio communication network can be optimized.

Figure 4:
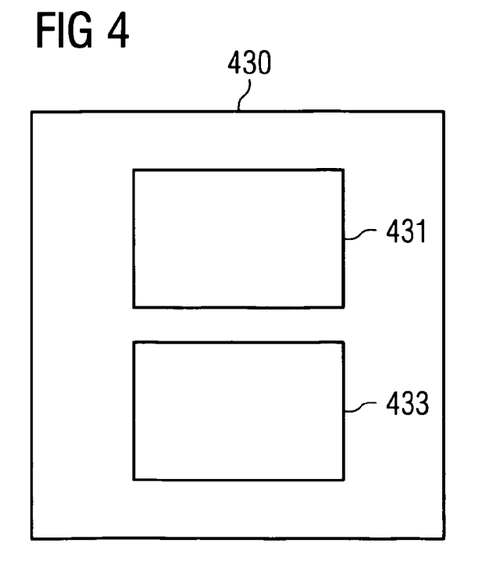
FIG. 4 shows a second (target) base station for a mobile radio communication network for optimizing the handover behavior of the mobile radio communication network.

FIG. 4 shows a second (target) base station 430 for a mobile radio communication network for optimizing the HO behavior of the mobile radio communication network. The second BS 430 comprises (a) a control unit 431 for controlling a HO of a UE from a first BS of the mobile radio communication network to the second BS 430 and (b) a receiving unit 433 for receiving an extended UE history record being associated with the UE from the first BS station, wherein an information element representing a property of the radio link between the user equipment and the first base station has been added to the extended UE history record. Thereby, based on the information element added to the extended UE history record the HO behavior of the mobile radio communication network can be optimized.

It is noted that it may also be possible in further refinements of the invention to combine features from different illustrative embodiments described herein. It should also be noted that reference signs in the claims should not be construed as limiting the scope of the claims.

LIST OF REFERENCE SIGNS

100 mobile radio communication network
110 central unit/Operation And Maintenance (OAM) Center
115*a* Northbound interface
115*b* Northbound interface
120 base station/eNodeB
125 X2-interface
125*a* cell border
130 base station/eNodeB
140 user equipment (UE)
140*a* movement of UE
160 data record/(extended) UE history
260*a* data record/(extended) UE history
260*b* data record/(extended) UE history
260*c* data record/(extended) UE history
320 base station/eNodeB
321 control unit
322 adding unit
323 transmitting unit
430 base station/eNodeB
431 control unit
433 receiving unit

The invention claimed is:

1. A method for optimizing a handover behavior of a mobile radio communication network comprising at least a first base station and a second base station, the method comprising:
  performing a handover of a user equipment from the first base station to the second base station,
  adding, by the first base station, an information element representing a property of a radio link between the user equipment and the first base station to a data record being associated with the user equipment, wherein the information element indicates at least a type of a measurement event responsible for triggering the handover of the user equipment, transmitting, by the first base station, the data record from the first base station to the second base station, and optimizing, by the first base station, the handover behavior of the mobile radio communication network based on the added information element, wherein optimizing the handover behavior comprises adapting the value of at least one handover radio threshold for triggering a handover of the user equipment between different base stations because of radio link conditions being experienced by the user equipment and/or adapting the value of at least one traffic steering parameter for changing the distribution of the radio data load between different radio cells of the mobile radio communication network.

2. The method as set forth in claim 1, wherein optimizing the handover behavior comprises:

adapting the value of at least one traffic steering parameter for changing the distribution the radio data load between different radio cells of the mobile radio communication network.

3. The method as set forth in claim 1, further comprising:

controlling a further handover of the user equipment from the second base station to the first base station of the mobile radio communication network, receiving the data record associated with the user equipment, wherein the data record comprises a further information element, added by the second base station, representing a property of the radio link between the user equipment and the second base station, wherein optimizing the handover behavior of the mobile radio communication network is carried out further based on the added further information element.

4. The method as set forth in claim 1, wherein the first base station is assigned to a first radio access technology and the second base station is assigned to a second radio access technology, wherein the second radio access technology is different from the first radio access technology.

5. The method as set forth in claim 1, wherein a first radio link between the user equipment and the first base station is assigned to a first radio frequency and a second radio link between the user equipment and the second base station is assigned to a second radio frequency, wherein the second radio frequency is different from the first radio frequency.

6. The method as set forth in claim 1, wherein the data record comprises characteristic information about one or more radio connections between the user equipment and one or more base stations which have served the user equipment in the past.

7. The method as set forth in claim 1, wherein the characteristic information comprises:

a dwell time representing the time duration of the radio connection between the user equipment and the first base station, and/or a cell identifier of the first base station.

8. The method as set forth in claim 3, wherein the property of the radio link between the user equipment and the first base station is indicative for the cause of triggering the handover, and the property of the radio link between the user equipment and the second base station is indicative for the cause of triggering the further handover.

9. The method as set forth in claim 8, wherein the cause of triggering the handover are at least one of:

radio link conditions being experienced by the user equipment; and a traffic steering procedure for changing a distribution of the radio data load between different radio cells of the mobile radio communication network.

10. The method as set forth in claim 3, wherein the property of the radio link between the user equipment and the first base station and/or the property of the radio link between the user equipment and the second base station is determined by a Quality of Service which the user equipment enjoyed before the handover.

11. The method as set forth in claim 3, wherein the property of the radio link between the user equipment and the first base station is determined by the location of the user equipment during the handover, and the property of the radio link between the user equipment and the second base station is determined by the location of the user equipment during the further handover.

12. The method as set forth in claim 3, wherein the further information element is indicative for the type of a measurement event which is responsible for triggering the handover.

13. A first base station comprising:

at least one processor; and at least one memory including computer program code, the at least one memory and the computer program code configured, with the at least one processor, to cause the first base station to perform at least the following:

control a handover of a user equipment from the first base station to a second base station of a mobile radio communication network, add, by the first base station, an information element representing a property of a radio link between the user equipment and the first base station to a data record being associated with the user equipment, wherein the information element indicates at least a type of a measurement event responsible for triggering the handover of the user equipment, and transmit, by the first base station, the data record from the first base station to the second base station, wherein based on the information element added to the data record the handover behavior of the mobile radio communication network can be optimized by adapting the value of at least one handover radio threshold for triggering a handover of the user equipment between different base stations because of radio link conditions being experienced by the user equipment and/or adapting the value of at least one traffic steering parameter for changing the distribution of the radio data load between different radio cells of the mobile radio communication network.

14. A second base station comprising:

at least one processor; and at least one memory including computer program code, the at least one memory and the computer program code configured, with the at least one processor, to cause the second base station to perform at least the following:

control a handover of a user equipment from a first base station of a mobile radio communication network to the second base station, receive, by the second base station from the first base station, a data record being associated with the user equipment from the first base station, wherein an information element representing a property of a radio link between the user equipment and the first base station has been added to the data record, wherein the information element indicates at least a type of a measurement event responsible for triggering the handover of the user equipment, wherein based on the information element added to the data record the handover behavior of the mobile radio communication network can be optimized by adapting the value of at least one handover radio threshold for triggering a handover of the user equipment between different base stations because of radio link conditions being experienced by the user equipment and/or adapting the value of at least one traffic steering parameter for changing the distribution of the radio data load between different radio cells of the mobile radio communication network.

15. The first base station of claim 13, wherein the mobile radio communication network is optimized by adapting the value of at least one traffic steering parameter for changing the distribution of the radio data load between different radio cells of the mobile radio communication network.

16. The first base station of claim 13, wherein the first base station is assigned to a first radio access technology and the second base station is assigned to a second radio access technology, wherein the second radio access technology is different from the first radio access technology.

17. The first base station of claim 13, wherein
the data record comprises characteristic information about one or more radio connections between the user equipment and one or more base stations which have served the user equipment in the past.

18. The method as set forth in claim 1, wherein the type of the measurement event which is responsible for triggering the handover indicates at least one of: an intra Radio Access Technology (RAT) measurement event and an inter-RAT measurement event.

19. The method of claim 1, further comprising:
in response to detecting that the user equipment disconnected from the mobile radio communication network, deleting the data record that is associated with the user equipment.

20. The first base station of claim 13, wherein the at least one memory and the computer program code are configured, with the at least one processor, to cause the first base station to perform at least:
in response to detecting that the user equipment disconnected from the mobile radio communication network, deleting the data record that is associated with the user equipment.

* * * * *